UNITED STATES PATENT OFFICE.

CARL FRIEDRICH MARIA SCHAERGES, OF BASLE, SWITZERLAND, ASSIGNOR TO F. HOFFMAN-LA ROCHE & CO., OF SAME PLACE AND GRENZACH, GERMANY.

MERCUR-AMMONIUM COMPOUND AND PROCESS OF MAKING SAME.

SPECIFICATION forming part of Letters Patent No. 628,417, dated July 4, 1899.

Application filed April 11, 1899. Serial No. 712,648. (Specimens.)

*To all whom it may concern:*

Be it known that I, CARL FRIEDRICH MARIA SCHAERGES, doctor of philosophy and chemist, a subject of the King of Bavaria, residing at Basle, Switzerland, have invented a Process for the Manufacture of a New Compound of Mercuric Phenolparasulfonate with Ammonium Tartrate, of which the following is a full, clear, and exact specification.

Among mercury salts soluble in water mercuric chlorid is still most commonly used as an antiseptic, notwithstanding that its highly poisonous and caustic properties and its power of precipitating albumin render its use undesirable. The many experiments conducted for the purpose of preparing mercury derivatives having antiseptic properties equal to those of mercuric chlorid without the injurious characteristics of that salt have resulted, indeed, in the production of a series of compounds, none of which, however, has fulfilled expectations. Thus a solution of the compound of mercuric chlorid with urea has been used, mercuric ethyl chlorid has been prepared, and such mercuric salts as the citrate, acetate, cyanid, arsenite, cyanate, phenolacetate, naphtholacetate, and silicofluorid. Double mercury compounds have also been employed, such as ammonium, mercuric chlorid, phenol-mercuric acetate, and the like. All these substitutes for mercuric chlorid share with this salt the disadvantages that they precipitate albumin and attack surgical instruments. Moreover, the majority of them have a less antiseptic action than mercuric chlorid has. Mercuric oxycyanid can alone be considered as comparable with the chlorid; but it attacks the instruments considerably, so that surgeons still prefer a solution of carbolic acid or of soap containing creosol to mercuric chlorid or oxycyanid solution as a disinfectant for their instruments.

It is known that mercuric parasulfocarbolate, (hydrargyrum parasulphophenylicum,) unlike other soluble mercuric salts, does not precipitate albumin, while it does precipitate the toxins. The objection to the use of this salt, however, is that it is decomposed not only by dilute acids and dilute alcohol, but when the attempt is made to dissolve it in water it decomposes with separation of basic salts. By the present invention I prepare a stable compound of mercuric phenolparasulfonate possessed of the valuable properties of this salt. For this purpose one molecular proportion of mercuric phenolparasulfonate and four molecular proportions (or any desired larger proportion) of ammonium tartrate are dissolved together, whereupon there is formed a peculiar double salt, which does not decompose even when the solution is evaporated and contains fifteen per cent. of mercuric oxid.

Example: 4.32 kilos of yellow mercuric oxid are dissolved in the proper molecular proportion (20.76 kilos) of phenolparasulfonic acid of thirty-three and one-third per cent. strength. To the warm solution there are added 13.44 kilos of crystallized tartaric acid. The mixture is neutralized by adding 13.5 kilos of a solution of ammonia of twenty per cent. strength, and the solution is evaporated to dryness on the steam-bath, being stirred meanwhile.

The solution of mercuric oxid in phenolparasulfonic acid may be added to the ammonium tartrate instead of as prescribed above, the rest of the procedure being the same.

The composition of the new double salt corresponds with the formula

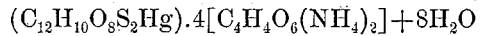

$$(C_{12}H_{10}O_8S_2Hg).4[C_4H_4O_6(NH_4)_2]+8H_2O$$

which should contain 15.1 per cent. of HgO. By analysis fifteen per cent. was found. The salt dissolves easily in warm water, and even its concentrated solutions remain clear when cooled. That the product in question is an individual compound is shown by the fact that it dissolves easily in water, while mercuric phenolparasulfonate is insoluble in water and only dissolves in ammonium-tartrate solution when at least four molecules thereof are present to one molecule of the mercuric salt, and even then the dissolution is very slow, whereas the new double compound dissolves quickly and easily. The compound cannot be obtained by merely mixing mercuric phenolparasulfonate and ammonium tartrate, evaporation being necessary.

The mercury in the compound cannot be recognized by the ordinary reagents. Sulfureted hydrogen precipitates black mercuric sulfid only on warming the solution during a long time, and ammonium sulfid gives the same precipitate only on heating the solution.

Bacteriological and clinical experiments have demonstrated the therapeutic value of this material and its advantages over mercuric chlorid and other usual mercury compounds—namely, its easy solubility in water, its greater antiseptic power, and its less poisonous and non-caustic character.

The new compound does not precipitate albumin, so that its action makes itself felt in the interior of the wound, and it does not attack iron even when long in contact therewith, so that when it is used carbolic solution, or solution of soap containing creosol, for disinfecting the instrument is unnecessary.

What I claim is—

1. A process for the manufacture of a compound of mercuric phenolparasulfonate with ammonium tartrate by dissolving freshly-prepared mercuric phenolparasulfonate with tartaric acid and ammonia and evaporating to dryness.

2. As a new article of manufacture the described compound of mercuric phenolparasulfonate with ammonium tartrate, which corresponds with the formula $$(C_{12}H_{10}O_8S_2Hg).4[C_4H_4O_6(NH_4)_2]+8H_2O$$

dissolves easily in warm water, possesses a great antiseptic power and has a non-caustic character.

In witness whereof I have hereunto signed my name, this 29th day of March, 1899, in the presence of two subscribing witnesses.

CARL FRIEDRICH MARIA SCHAERGES.

Witnesses:
GEORGE GIFFORD,
AMAND RITTER.